United States Patent
Chang

(10) Patent No.: US 7,496,842 B2
(45) Date of Patent: Feb. 24, 2009

(54) APPARATUS AND METHOD FOR AUTOMATIC SPELLING CORRECTION

(75) Inventor: Horng-Yi Chang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 283 days.

(21) Appl. No.: 10/817,804

(22) Filed: Apr. 6, 2004

(65) Prior Publication Data
US 2004/0255248 A1 Dec. 16, 2004

(30) Foreign Application Priority Data
Jun. 11, 2003 (TW) .............................. 92115805 A

(51) Int. Cl.
*G06F 17/00* (2006.01)

(52) U.S. Cl. ...................................... 715/257
(58) Field of Classification Search ................ 715/533, 715/257
See application file for complete search history.

(56) References Cited

U.S. PATENT DOCUMENTS

| | | | | |
|---|---|---|---|---|
| 5,953,541 A * | 9/1999 | King et al. | ..................... | 710/67 |
| 6,556,841 B2 * | 4/2003 | Yu | ........................... | 455/556.1 |
| 6,587,819 B1 * | 7/2003 | Lu | .............................. | 704/257 |
| 6,646,573 B1 * | 11/2003 | Kushler et al. | ................ | 341/28 |
| 2002/0196163 A1 * | 12/2002 | Bradford et al. | .............. | 341/22 |

OTHER PUBLICATIONS

"Pinyin," Encyclopedia Americana, 2007, Grolier Online, Aug. 28, 2007 (http://ea-ada.grolier.com/cgi-bin/article?assetid=0313920-00>, p. 1.*

* cited by examiner

*Primary Examiner*—Amelia Rutledge
(74) *Attorney, Agent, or Firm*—Rabin & Berdo, PC

(57) ABSTRACT

An automatic spelling correction apparatus. The apparatus comprises a storage device and a processing unit. The storage device stores a character group table containing a character sequence of each cycled button, and multiple character combination records. A processing unit receives an original character combination and a new character, to determine whether the original character combination has a valid spelling, if not, a valid character combination matching the character combination record according to the character group table is generated.

13 Claims, 4 Drawing Sheets

| Button# | Arabic Numeral Input Mode | Zhu Yin Fu Hao Input Mode | English Input Mode |
|---|---|---|---|
| 1 | 1 | ㄅㄆㄇㄈ | |
| 2 | 2 | ㄉㄊㄋㄌ | ABC |
| 3 | 3 | ㄍㄎㄏ | DEF |
| 4 | 4 | ㄐㄑㄒ | GHI |

| Combination# | Phonetic Symbol Combination |
|---|---|
| 1 | 出万 |
| 2 | 出幺 |
| 3 | 出又 |
| 4 | 出马 |
| 5 | 出ㄣ |

FIG. 4a

| Combination# | English Letter Combination |
|---|---|
| 1 | tek |
| 2 | tel |
| 3 | tem |
| 4 | ten |
| 5 | teo |
| 6 | tep |
| 7 | teq |
| 8 | ter |
| 9 | tes |

FIG. 4b

APPARATUS AND METHOD FOR AUTOMATIC SPELLING CORRECTION

BACKGROUND OF THE INVENTION

1. Field of the Invention

The present invention relates to input correction, and more particularly to a method and apparatus for automatic spelling correction.

2. Description of the Related Art

Handheld devices, such as cellular phones, and PDAs, are designed to be small enough to meet mobility requirements. In order to reduce size handheld devices provide a limited number of buttons for input, and the sum of the buttons is less the total number of characters, such as English letters or phonetic symbols corresponding with Zhu Yin Fu Hao phonetic symbol system. Mobile phones, for example, are limited to 12 buttons for input of phonetic symbols to assemble a Chinese character while the Zhu Yin Fu Hao phonetic symbol system has 37 phonetic symbols, resulting in input difficulty. Hence, cycled buttons, capable of inputting character combinations with one key have been introduced for use in handheld devices. The cycled button enables to input a series of character elements by continuous key pressing. Cycled buttons are discussed in further detail in the following.

FIG. 1 is a schematic diagram of a conventional key pad of mobile phone. Buttons 10 to 19 are utilized to input Arabic numerals, phonetic symbols, English letters, or other characters associated with a particular input mode. In Zhu Yin Fu Hao input mode, the phonetic symbol "ㄅ" is input by pressing button 11, and is subsequently, "ㄅ" replaced with "ㄆ", "ㄇ" and "ㄈ" in sequence when button 11 is pressed continuously. In addition, "ㄢ" is appended to "ㄅ" to generate the phonetic symbol combination "ㄅㄢ" since "ㄅ" is input when button 19 is pressed. Similarly, cycled button input is also applicable to English entries. The letter "A" is input by pressing button 12. "A" is replaced sequentially by "B" and then "C" when button 12 is pressed continuously. Further, after the letter "A" after is input the letter "W" is appended to "A" by pressing button 19 to generate the character combination "AW".

Although character entry via cycled button is functional, requiring additional keystrokes to input a phonetic symbol or an English letter may be considered by some to be inconvenient or even difficult. For example, the phonetic symbol combination "ㄆ一ㄣ" requires only 3 keystrokes, it requires a total of 6 keystrokes using the cycled buttons described above.

It has often been argued manipulating cycled buttons is difficult due to small, difficult to read prompts. Additionally, when an incorrect character is input, the "clear" button must be pressed to first erase the character before the correct character can be input, resulting in additional keystrokes. For example, when the intended input is "ㄓㄞ", but "ㄓㄢ" is entered instead, the clear button must first be pressed to erase "ㄢ", and button 18 must then be pressed to append "ㄞ" to "ㄓ".

Moreover, a series of not only characters but character combinations are generated by continuously pressing cycled buttons. Not all character combinations, however, have valid spelling. For example, "ㄓㄞ", "ㄓㄟ", "ㄓㄠ" and "ㄓㄡ" are sequentially generated by pressing the button 18 after "ㄓ" is input, but "ㄓㄟ" is an invalid spelling. Hence, it is desirable to provide a means of automatically disregarding the invalid spelling, thereby eliminating unnecessary additional keystrokes.

In view of these limitations, a need exists for a method and an apparatus of automatic spelling correction to effectively reduce keystrokes.

SUMMARY OF THE INVENTION

It is therefore an object of the present invention to provide a system and method of automatic spelling correction to reduce keystrokes.

According to the invention, the system comprises a storage device, a processing unit, and a display unit.

The storage device stores a character group table and multiple character combination records. The character group table stores a character sequence associated with a cycled button and an input mode. The character combination records and stores multiple character combinations indicating the partial or complete valid spelling.

After inputting an original character combination and a new input signal, the processing unit first determines whether the new and prior input signals correspond to the same cycled button.

When the new and prior input signals correspond to different cycled buttons, the processing unit first obtains a new character by reading the first character of a sequence from the group table corresponding to the new input signal, generates a first character combination by appending the new character to the original character combination, and subsequently, determines whether the first character combination has valid spelling according to the character combination record. Once the first character combination has valid spelling, the combination is displayed. Conversely, the processing unit replaces the last character of the original character combination with the new character to generate a second character combination.

When the new and prior input signals correspond to the same cycled button, the processing unit first obtains a new character by reading the next character of a character sequence from the group table according to the prior input character, generates a third character combination by replacing the last character of the original character combination with the new character, then determines whether the third character combination has valid spelling based on the character combination record. The third character combination, with valid spelling, regenerated by replacing the last character based on the character group table is displayed. The described regeneration procedure is executed continuously until a valid spelling is generated.

BRIEF DESCRIPTION OF THE DRAWINGS

The present invention can be more fully understood by reading the subsequent detailed description and examples with references made to the accompanying drawings, wherein:

FIG. 4a is a diagram of an exemplary phonetic symbol combination record according the invention;

FIG. 4b is a diagram of an exemplary English letter combination record according to the invention;

DETAILED DESCRIPTION OF THE INVENTION

Figures 2, 3:
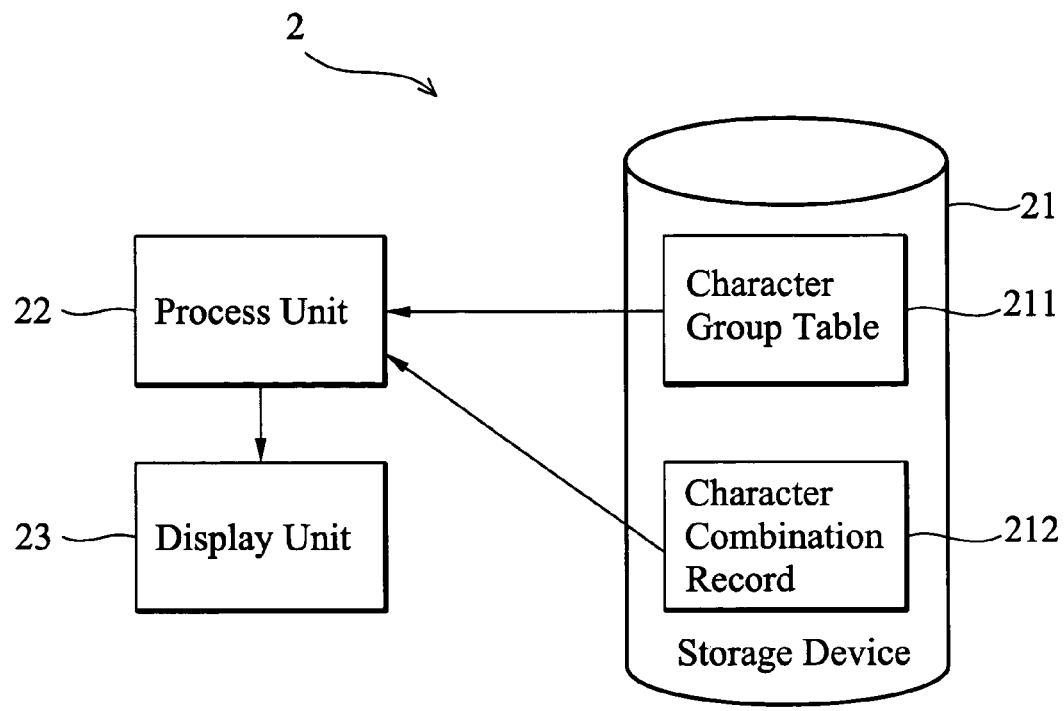
FIG. 2 is a schematic diagram of an apparatus of automatic spelling correction according to the invention.
FIG. 3 is a diagram of an exemplary character group table according to the invention.

FIG. 2 is a schematic diagram of an apparatus for automatic spelling correction according to the invention. The apparatus comprises a storage device 21, a processing unit 22, and a display unit 23. The storage device 21 stores a character group table 211 and multiple character combination records 212, and can be a ROM, RAM, flash ROM or the like. Although the apparatus in a preferred embodiment is a handheld device, any electronic device with cycled buttons provided to input characters, such as Arabic numerals, English letters, phonetic symbols corresponding with Zhu Yin Fu Hao phonetic symbol system, or others, is applicable. The character group table 211 stores a character sequence composed of multiple characters, associated with a cycled button and an input mode.

FIG. 3 is a diagram of an exemplary character group table according to the invention. Record 32 contains three character sequences corresponding to the cycled button 12, associated with various input modes, and each character sequence includes multiple characters. In Arabic numeral input mode, character "2" is input when the cycled button 12 is pressed. In Zhu Yin Fu Hao input mode, characters, i.e. "ㄅ", "ㄉ", "ㄋ" and "ㄌ", are sequential and cycled input. In addition, characters, such as "A", "B" and "C", are sequential and cycled input in English input mode. Consistent with the scope and spirit of the invention, additional or different fields may be provided.

The character combination records 212 store multiple character combinations representing possible spellings for words, i.e. Chinese characters, English words, and the like. For example, a Chinese character "追" spelled "ㄓ ㄨ ㄟ" consists of two possible character combinations "ㄓ ㄨ" and "ㄓ ㄨ ㄟ". The character combination is not limited in Chinese and English spelling, consistent with the scope and spirit of the invention, spellings corresponding with different languages may be applied.

FIG. 4a is a diagram of an exemplary character combination record according the invention. The character pair combinations, such as "ㄓ ㄞ", "ㄓ ㄠ", "ㄓ ㄡ", "ㄓ ㄢ" and "ㄓ ㄣ" are stored in records 411, 412, 413, 414 and 415 respectively. FIG. 4b is a diagram of other exemplary character combination records according to the invention. The triple character combinations, such as "tek", "tel", "tem", or others, are stored in records 421 to 429 respectively. Although a table structure is described in the above examples, a tree structure, a linked list, or other data structures are also applicable.

Referring to FIG. 2, after inputting an original character combination and a new input signal, the processing unit 22 first determines whether the new and prior input signals correspond to the same cycled button as is described in more detail in the following.

When the new and prior input signals correspond to different cycled buttons, the processing unit 22 first obtains a new character by reading the first character of a character sequence from the group table 211 corresponding to the new input signal, generates a first character combination by appending the new character to the original character combination, and subsequently, determines whether the first character combination has valid spelling according to the character combination record 212. Several methods, such as sequential search, binary search, quick search, or other algorithms can be applied to determine a specific valid spelling according to the character combination record 212. Once the first character combination has valid spelling, the combination is displayed on the display unit 23, otherwise, the processing unit 22 replaces the last character of the original character combination with the new character to generate a second character combination. For example, after inputting "ㄓ ㄞ" as an original character combination and "ㄣ" as a new input character, the second character combination "ㄓ ㄣ" appears instead of the first character combination "ㄓ ㄞ ㄣ" with invalid spelling, and the correct character combination is finally generated and displayed on the display unit 23.

When the new and prior input signals correspond to the same cycled button, the processing unit 22 first obtains a new character by reading the next character of a character sequence from the group table 211 according to the prior input character, generates a third character combination by replacing the last character of the original character combination with the new character, for example, the third character combination "ㄓ ㄠ" substitutes for the original character combination "ㄓ ㄟ", and subsequently, determines whether the third character combination has valid spelling based on the character combination record 212. The third character combination, which has valid spelling is displayed on the display unit 23, instead, is regenerated by replacing the last character of it based on the character group table 211. Such regeneration procedure is continually executed until a valid spelling is generated.

Figure 5:
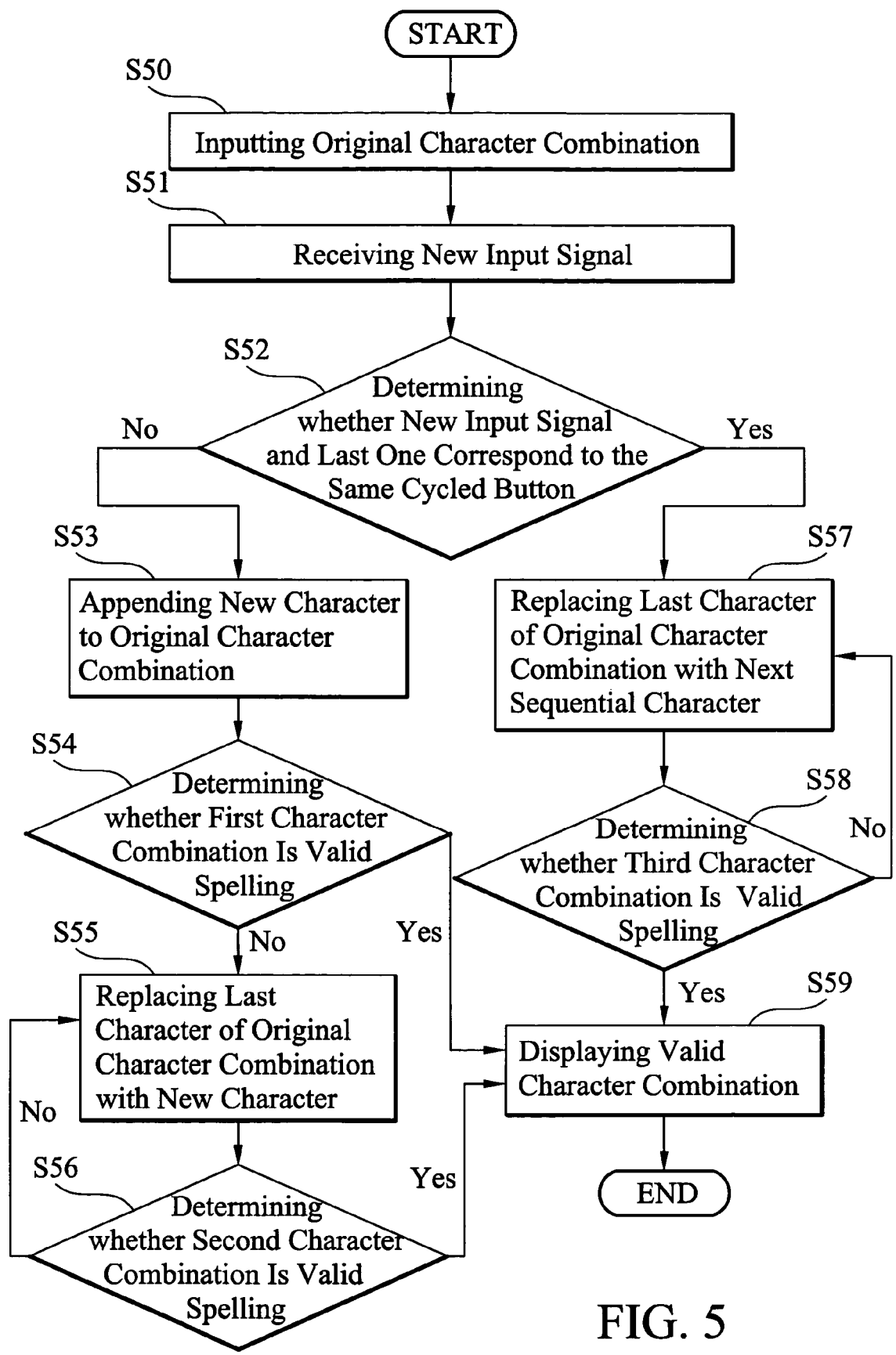
FIG. 5 is a flowchart showing a method of automatic spelling correction according to the invention.

FIG. 5 is a flowchart showing a method of automatic spelling correction according to the invention.

In step S50, an original character combination is input, then, in step S51, an input signal is received. In step S52, it is determined whether the new and prior input signals correspond to the same cycled button.

When the new and prior input signals correspond to different cycled buttons, the procedure proceeds to step S53, wherein a first character combination is generated by appending a new character corresponding to the new input signal to the original character combination. Subsequently step S54 determines whether the first character combination has valid spelling by comparing it with the character combination record 21. If so, the process proceeds to S59 and displays the first character combination on the display unit 23, otherwise, the procedure returns to S55 to replace the last character of the first character combination with the new character corresponding to the new input signal to generate a second character combination. Continuing to step S55, the process the procedure proceeds S56 to determine whether the second character combination has valid spelling, if so, the procedure proceeds to S59 to display the second character combination on the display unit 23, otherwise, the procedure returns to S55 to regenerate a character combination with valid spelling.

When the new and prior input signals correspond to the same cycled button, the process proceeds to S57, obtaining a new character by reading the next character of a character sequence from the group table 211 depending on the prior input character and replaces the last character of the original character combination with the new character to generate a third character combination. Subsequently, step S58 determines whether the third character combination has valid spelling, if so, the process proceeds to S59 to display the third character combination on the display unit 23, otherwise, the process returns to S57 to continually regenerate characters until a valid spelling is achieved.

Figure 1:
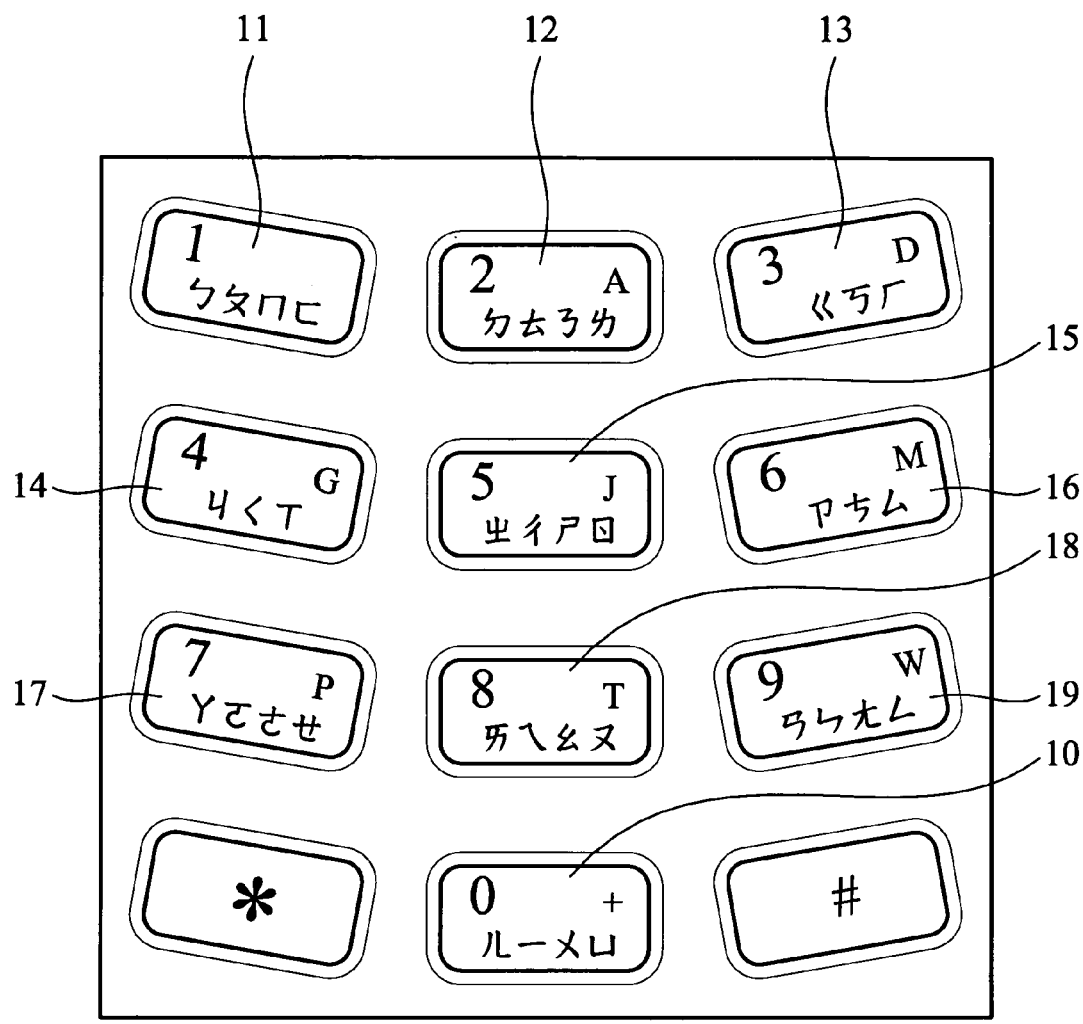
FIG. 1 is a schematic diagram of a conventional key pad on a mobile phone.

Further, referring to FIG. 1 and FIG. 5, the above method can be more fully understood by reading the following two exemplary cases.

In the first case, in step S50, the processing unit 22 inputs the original character combination "ㄓㄤ" and subsequently receives the new input signal corresponding to the cycled button 18 as in step S51. In step S52, the prior input signal is determined to correspond to the cycled button 19 but not 18, and the procedure proceeds to S53 to generate a first character combination "ㄓㄢㄞ". Once the first character combination "ㄓㄢㄞ" is determined to have invalid spelling by comparison with the character combination record 212 as in step S54, a second character combination "ㄓ ㄞ" is generated by replacing the last character of "ㄓ ㄢ" with "ㄞ" as in step S55. Once the second character combination is determined to have valid spelling as in step S56, the combination is displayed on the display unit 23 as in step S59.

In the second case, in step S50, the processing unit 22 inputs original character combination "ㄓ ㄞ" and subsequently receives the new input signal corresponding to the cycled button 18 as in step S51. In step S52, the new input signal is determined to be the same as the prior signal, a third character combination "ㄓㄟ" is then generated, as in step S57, by replacing the last character of "ㄓ ㄞ" with "ㄟ" according to the character group table 211. In step S58, once third character combination "ㄓㄟ" is determined to be an invalid spelling, the process proceeds to S57 to continually regenerate a third character combination "ㄓ ㄠ". Once "ㄓㄠ" is determined to have valid spelling as in step S58, the combination is displayed on the display unit 23 as in step S59.

The present invention automatically corrects spelling without manual operation of the clear key and skips invalid spelling, effectively reducing keystrokes.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. An automatic spelling correction apparatus with a plurality of cycled buttons corresponding with the Zhu Yin Fu Hao phonetic symbol system, wherein the sum of the cycled buttons is less than the sum of a plurality of characters, comprising:
   a display unit;
   a storage device capable of storing a character group table and a plurality of character combination records, the character group table storing a character sequence associated with each cycled button, each character combination record being composed of the characters representing valid spelling; and
   a processing unit configured to receive an original character combination and a first character corresponding to a first of the cycled buttons; determining whether the last character of the original character combination and the first character correspond to different cycled buttons;
   if the last character of the original character combination and the first character correspond to different cycled buttons, executing the following steps:
   generating a first character combination by appending the first character to the original character combination,
   determining whether the first character combination is valid spelling; displaying the first character combination on the display unit if the first character combination is valid spelling, and
   if the first character combination is not valid spelling, searching a second character following the first character along the stored character sequence associated with the first cycled button, generating a second character combination by appending the second character to the original character combination, and displaying the second character combination on the display unit,
   if the last character of the original character combination and the first character correspond to identical cycled buttons, executing the following step:
   generating a third character combination by replacing the last character of the original character combination with a relevant character according to the character sequence and the first character until the third character combination matches the character combination record.

2. The apparatus as claimed in claim 1 wherein the first character combination input by the processing unit is determined to have valid spelling by comparison with the character combination records.

3. The apparatus as claimed in claim 1 wherein the apparatus is a handheld communication device.

4. The apparatus as claimed in claim 1 wherein the display unit displays the third character combination.

5. A method of automatic spelling correction for an electronic device with a plurality of cycled buttons corresponding with the Zhu Yin Fu Hao phonetic symbol system, wherein the electronic device has a character group table and a plurality of character combination records, the sum of the cycled buttons is less than the sum of a plurality of characters, the character group table stores a character sequence associated with each cycled button, and each character combination record is composed of the characters representing a valid spelling, comprising the steps of:
   receiving an original character combination containing at least the character;
   receiving a first character corresponding to a first of the cycled buttons;
   determining whether the last character of the original character combination and the first character correspond to different cycled buttons;
   if the last character of the original character combination and the first character correspond to different cycled buttons, executing the following steps:
   generating a first character combination by appending the first character to the original character combination;
   determining whether the first character combination is valid spelling;
   displaying the first character combination if the first character combination is valid spelling; and
   if the first character combination is not valid spelling, searching a second character following the first character along with the first cycled button, generating a second character combination by appending the second character to the original character combination, and displaying the second character combination;
   if the last character of the original character combination and the first character correspond to identical cycled buttons, executing the following step:
   generating a third character combination by replacing the last character of the original character combination with a relevant character according to the character sequence and the first character until the third character combination matches the character combination record.

6. The method as claimed in claim 5, wherein the first character combination is determined to be invalid spelling by comparing the character combination records.

7. The method as claimed in claim 5, wherein the electronic device is a handheld communication device.

8. The method as claimed in claim 5, further comprising a step of displaying the third character combination.

9. An apparatus of automatic spelling correction with a plurality of cycled buttons corresponding with the Zhu Yin Fu Hao phonetic symbol system, wherein the sum of the cycled buttons is less than the sum of a plurality of characters corresponding with, comprising:

a storage device capable of storing a character group table and a plurality of character combination records, wherein the character group table stores a character sequence of each cycled button, and each character combination record is composed of the characters representing a valid spelling; and a processing unit configured to receive an original character combination and a first character corresponding to the cycled button, and determine whether the last character of the original character combination and the first character correspond to different cycled buttons;

if the last character of the original character combination and the first character correspond to different cycled buttons, executing the following steps:

generating a first character combination by appending the first character to the original character combination;

determining whether the first character combination is a valid spelling; displaying the first character combination on the display unit if the first character combination is a valid spelling; and if the first character combination is not a valid spelling, searching a second character following the first character along the stored character sequence associated with the first cycled button, generating a second character combination by appending the Second character to the original character combination, and displaying the second character combination on the display unit;

if the last character of the original character combination and the first character correspond to identical cycled buttons, executing the following step:

generating a third character combination by replacing the last character of the original character combination with a relevant character according to the character sequence and the first character until the third character combination matches the character combination record.

10. The apparatus as claimed in claim 9 wherein the apparatus is a handheld communication device.

11. The apparatus as claimed in claim 9 further comprising a display unit displaying the third character combination.

12. The apparatus as claimed in claim 9 wherein if the new character and the last character of the original character combination input by the processing unit correspond to the same cycled button, generating a fourth character combination by replacing the last character of the original character combination with relevant character according to the character sequence until matching the character combination record.

13. The apparatus as claimed in claim 12 further comprising a display unit displaying the fourth character combination.

* * * * *